United States Patent
Ferreira Moreno et al.

(10) Patent No.: US 10,860,120 B2
(45) Date of Patent: Dec. 8, 2020

(54) METHOD AND SYSTEM TO AUTOMATICALLY MAP PHYSICAL OBJECTS INTO INPUT DEVICES IN REAL TIME

(71) Applicant: INTERNATIONAL BUSINESS MACHINES CORPORATION, Armonk, NY (US)

(72) Inventors: Marcio Ferreira Moreno, Rio de Janeiro (BR); Rafael Rossi de Mello Brandao, Rio de Janeiro (BR); Juliana Jansen Ferreira, Rio de Janeiro (BR); Daniel Salles Chevitarese, Rio de Janeiro (BR); Ana Fucs, Rio de Janeiro (BR); Vinicius Costa Villas Boas Segura, Rio de Janeiro (BR); Renato Fontoura de Gusmao Cerqueira, Rio de Janeiro (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/209,170

(22) Filed: Dec. 4, 2018

(65) Prior Publication Data
US 2020/0174580 A1  Jun. 4, 2020

(51) Int. Cl.
*G06F 3/038* (2013.01)
*G06K 9/00* (2006.01)
(Continued)

(52) U.S. Cl.
CPC .............. *G06F 3/038* (2013.01); *G06F 3/017* (2013.01); *G06F 3/03542* (2013.01);
(Continued)

(58) Field of Classification Search
CPC .......... G06F 3/038; G06F 3/017; G06F 3/005; G06F 3/014; G06F 3/0346;
(Continued)

(56) References Cited

U.S. PATENT DOCUMENTS

| 6,663,393 B1 | 12/2003 | Ghaly |
| 7,394,459 B2 | 7/2008 | Bathiche et al. |

(Continued)

FOREIGN PATENT DOCUMENTS

| WO | 2015102903 | 7/2015 |

*Primary Examiner* — Alexander Eisen
*Assistant Examiner* — Cory A Almeida
(74) *Attorney, Agent, or Firm* — F. Chau & Associates, LLC

(57) ABSTRACT

Systems and methods are described for mapping input devices in real time. The method may include controlling a camera to capture a plurality of images, performing object recognition on the images to identify a plurality of objects, determining properties for each identified object that enable the corresponding object to provide spatial data and interaction data of a preferred input device, ranking the objects according to the determined properties, presenting the identified objects in an order corresponding to the rank that enables a user to select one of the presented objects, tracking the selected object and a human being, generating spatial data and interaction data from a result of the tracking, and providing the generated spatial data and interaction data to a computer to emulate the events of the preferred input device.

20 Claims, 9 Drawing Sheets

(51) Int. Cl.
  *G06F 3/0354* (2013.01)
  *G06F 3/01* (2006.01)
  *G06K 9/62* (2006.01)

(52) U.S. Cl.
  CPC ..... *G06F 3/03543* (2013.01); *G06K 9/00624* (2013.01); *G06K 9/628* (2013.01)

(58) Field of Classification Search
  CPC ............ G06F 3/03542; G06F 3/03543; G06K 9/00624; G06K 9/628
  See application file for complete search history.

(56) References Cited

U.S. PATENT DOCUMENTS

| | | |
|---|---|---|
| 8,386,918 B2 | 2/2013 | Do et al. |
| 8,836,768 B1 | 9/2014 | Rafii et al. |
| 2010/0164990 A1 | 7/2010 | Van Doorn |
| 2011/0205341 A1 | 8/2011 | Wilson et al. |
| 2013/0249944 A1 | 9/2013 | Raghoebardayal |
| 2016/0253842 A1* | 9/2016 | Shapira ................ G02B 27/017 345/633 |
| 2017/0329515 A1* | 11/2017 | Clement ................ G06F 3/011 |

* cited by examiner

METHOD AND SYSTEM TO AUTOMATICALLY MAP PHYSICAL OBJECTS INTO INPUT DEVICES IN REAL TIME

BACKGROUND

The following relates generally to object mapping, and more specifically to mapping input devices in real time.

Users interact with computing devices in a variety of ways. The purposes of these interactions include manipulating data, accessing information, and interacting with entertainment applications.

Currently, user interaction is frequently limited to available input devices within reach. Moreover, such interaction is restricted by the ergonomics and affordances of these devices. For instance, users are commonly limited to the use of mouse or touchpad devices as a pointer device. This limitation is even more evident when interacting with mobile devices since they provide a limited interaction experience through touchscreens. In this context, if users want a richer interaction, they need to carry additional input devices to perform activities such as programming, word processing, or creating slide presentations.

SUMMARY

A method for mapping input devices in real time is described. The method may include controlling a camera to capture a plurality of images, performing object recognition on the images to identify a plurality of objects, determining properties for each identified object that enable the corresponding object to provide spatial data and interaction data (e.g., button press or pointing data) as a preferred input device (e.g., a mouse device, a keyboard, or a pointing device), chosen by the user (who may be present or not) in the user environment, ranking the objects according to the determined properties, presenting the identified objects in an order corresponding to the rank that enables a user to select one of the presented objects, tracking the selected object and a human being, generating spatial data and interaction data from a result of the tracking, and providing the generated spatial data and interaction data to a computer.

A system for object mapping is described. The system may include a display device, a camera, a processor, memory in electronic communication with the processor, and instructions stored in the memory. The instructions may be operable to cause the processor to control a camera to capture a plurality of images, perform object recognition on the images to identify a plurality of objects, determine properties for each identified object that enable the corresponding object to provide spatial data and interaction data of the preferred input device (e.g. pointing device, touchpad, typewriter-style device, etc.), rank the objects according to the determined properties, present the identified objects in an order corresponding to the rank that enables a user to select one of the presented objects, track the selected object and a human being, generate spatial data and interaction data from a result of the tracking, and provide the generated spatial data and interaction data to a computer.

A non-transitory computer readable medium storing code for object mapping is described. In some examples, the code comprises instructions executable by a processor to: control a camera to capture a plurality of images, perform object recognition on the images to identify a plurality of objects, determine properties for each identified object that enable the corresponding object to provide spatial data and interaction data of the preferred input device, rank the objects according to the determined properties, present the identified objects in an order corresponding to the rank that enables a user to select one of the presented objects, track the selected object and a human being, generate spatial data and interaction data from a result of the tracking, and provide the generated spatial data and interaction data to a computer.

In some examples of the method, system, and non-transitory computer-readable medium described above, the tracking comprises using the camera to capture an additional image, performing object recognition on the additional image to identify a first object that corresponds to the selected object and a second object that corresponds to a human being. In some examples of the method, system, and non-transitory computer-readable medium described above, the tracking of the selected object tracks actions (e.g. movements, surface-press, etc.) on the first object, and the spatial data is generated from the tracked actions.

In some examples of the method, system, and non-transitory computer-readable medium described above, the providing outputs the spatial data to an event handler of the computer that processes actions on the first object as events (e.g. movements, button-press, key-press, etc.) of the preferred input device. In some examples of the method, system, and non-transitory computer-readable medium described above, the tracking determines a distance of the tracked action, resizes the distance according to a size of the preferred input device, and the spatial data is generated from the resized distance.

Some examples of the method, system, and non-transitory computer-readable medium described above may further include providing the spatial data to an event handler of a computer that processes actions as events of the preferred input device. In some examples of the method, system, and non-transitory computer-readable medium described above, the preferred input device is a presentation pointer with a laser, the tracked action is the movement of a pen as the selected object (i.e., a human being moving a pen), the orientation of the pen indicates the orientation of the laser, and the spatial data is generated from the tracked actions.

Some examples of the method, system, and non-transitory computer-readable medium described above may further include providing the interaction data to an event handler of the computer that processes keystrokes of the preferred input device. In some examples of the method, system, and non-transitory computer-readable medium described above, the tracking of the selected object includes extracting features of the second object, applying the features to a classifier trained to classify input features into one of a plurality of gestures to identify one of the gestures, calculating a spatial distance between the identified gesture, mapping a closest one of a plurality of segments of the first object to the identified gesture, and determining the interaction data from the mapping.

In some examples of the method, system, and non-transitory computer-readable medium described above, the tracking of the selected object tracks an action of a finger (e.g., a movement, a click, etc.), and the interaction data is generated from a position of the tracked action with respect to the first object. In some examples of the method, system, and non-transitory computer-readable medium described above, the providing outputs the interaction data to an event handler of the computer that processes as keystrokes of the preferred input device.

Some examples of the method, system, and non-transitory computer-readable medium described above may further include segmenting the first object into a first section corresponding to a first functionality (e.g. button, key, touch, etc.) of the preferred input device and a second section corresponding to a second functionality of the preferred input device, sets the interaction data to indicate the first functionality has been selected when the position overlaps the first section, and sets the interaction data to indicate the second functionality has been selected when the position overlaps the second section. Then, setting the interaction data to indicate the first functionality has been activated when a position of a tracked event overlaps the first section, and setting the interaction data to indicate the second functionality has been activated when the position overlaps the second section.

Some examples of the method, system, and non-transitory computer-readable medium described above may further include resizing the first object prior to the segmenting to match a size of the preferred input device and moving the position in proportion to an amount of the resizing. In some examples of the method, system, and non-transitory computer-readable medium described above, the object recognition is based on a model of the preferred input device, wherein the model is based on meta parameters, and the graphical user interface (GUI) enables a user to change the meta parameters.

In some examples of the method, system, and non-transitory computer-readable medium described above, the object recognition is based on the additional image only considers objects within a certain field of view and the GUI enables a user to change a boundary of the field of view. In some examples of the method, system, and non-transitory computer-readable medium described above, the preferred input device is a mouse device.

DETAILED DESCRIPTION

Currently, user interaction with computing systems is frequently limited to available input devices within reach. In other words, users cannot use arbitrary objects as a support for tangible interaction. Aspects of the present disclosure allow users to use any object to interact with a system considering a different affordance for that object.

Affordance is the design aspect of an object which suggests how the object should be used. In an instrumented environment, the described system may recognize an object and associate to it affordances of a specific input device according to a user's commands, intentions or desires.

Examples of affordances include: handles may afford pulling, grasping and holding; switches and buttons may afford pressing, flipping, and switching states; discs, dials and cranks may afford turning and rotating; plain surfaces may afford touching, and pointed sharp objects may afford pointing.

Aspects of the present disclosure include replicating functionalities from input devices on objects to allow interaction even when no specialized input devices are available, as well as the possibility of collaborative interaction, with multiple users independently controlling input devices or objects mimicking input devices. In traditional operating systems it is only possible to control a single pointer even with multiple connected mice. The described systems and methods may eliminate or reduce the need to buy new input devices if there are physical objects that meet users' needs (i.e., it may result in cost reductions). The disclosed systems and methods may also improve convenience and availability of numerous objects that can be mapped into preferred input devices. Finally, automatic application of input device functionalities may be imposed on objects according to their design affordances, which may improve ease of input.

In one possible embodiment, the proposed system may use several sensors in instrumented environments, such as cameras, microphones, beacons, head tracking, eye tracking, etc. The system processes content from these sensors to recognize users, objects and user actions on those objects. Subsequently, based on commands received from users (by using voice and gestures or through a dashboard), the system detects specified objects as input devices, mapping descriptions of input device events to actions performed on objects. This mapping process is supported by high-level representations that are interpreted and executed by the system.

Figure 1:
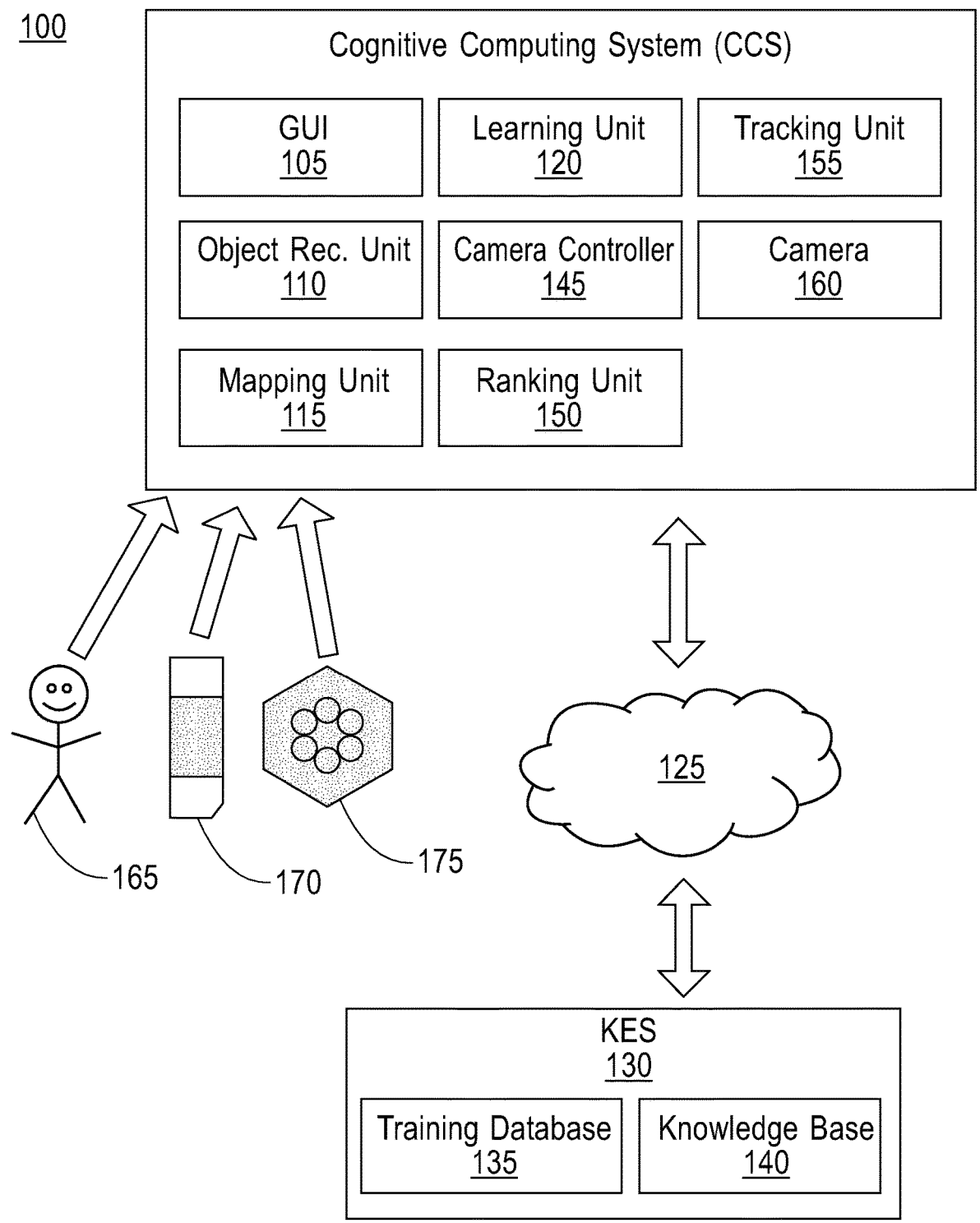
FIG. 1 shows an example of an architecture of an object mapping system in accordance with aspects of the present disclosure.

FIG. 1 shows an example of an architecture of an object mapping system 100 in accordance with aspects of the present disclosure. The example shown includes object mapping system 100, user 165, object 170, and environment 175.

The system considers an instrumented environment capable of sensing objects 170, users 165, and the environment 175. The object mapping system 100 may enable automatic detection of device affordances through environment sensing and device descriptions, automatic detection of real object affordances through environment sensing and device descriptions, automatic affordance mapping, automatic mapping of interactions with real objects 170 into input events (e.g. keystrokes, movements, clicks, touch, etc.), and object/device understanding that considers unsupervised object/device segmentation and multi-scale object/device affordance classification.

Users 165 may input commands into the object mapping system 100. The object mapping system 100 collect sensor information about available objects 170 and the surrounding environment 175.

Users 165 may interact with the object mapping system 100 through a dashboard or graphical user interface (GUI) 105. The object mapping system 100 applies computer vision mechanisms to identify objects 170 and their affordances, as well as users 165 and actions in the visual field. Users 165 preferences and feedback are registered by learning mechanisms, that can also be used to ingest training data to detect new objects 170 and actions. The mapping unit 115 associates objects 170 and devices of interest.

Object mapping system 100 may be an example of, or include aspects of, the corresponding elements described with reference to FIG. 2. It may include a cognitive computing system CCS, and a knowledge engineering subsystem (KES) 130. Knowledge description and training datasets are maintained by KES 130.

The CCS may include or interact with a graphical user interface (GUI) 105, object recognition unit 110, mapping unit 115, learning unit 120, communication system 125, training database 135, knowledge base 140, camera controller 145, ranking unit 150, tracking unit 155, and camera 160.

GUI 105 may present the identified objects 170 in an order corresponding to the rank that enables a user 165 to select one of the presented objects 170. GUI 105 may be an example of, or include aspects of, the corresponding elements described with reference to FIG. 2.

Object recognition unit 110 may perform object recognition on the images to identify a plurality of objects 170. Object recognition unit 110 may also determine properties for each identified object 170 that enable the corresponding object 170 to provide spatial data and interaction data of the preferred input device. Examples of interaction data may be a button press or pointing data. Examples of a preferred input device may be a mouse device, a keyboard, or a pointing device.

In some examples, the preferred input device is a presentation pointer with a laser, and the tracked action is the movement of a pen as the selected object 170, the orientation of the pen indicates the orientation of the laser, and the spatial data is generated from the tracked actions. In some examples, the object recognition is based on a model of the preferred input device, where the model is based on meta parameters, and the GUI 105 enables a user 165 to change the meta parameters. In some examples, the object recognition only considers objects 170 within a certain field of view and the GUI 105 enables a user 165 to change a boundary of the field of view. In some examples, the preferred input device is a mouse device.

Mapping unit 115 may generate spatial data and interaction data from a result of the tracking. Mapping unit 115 may also provide the generated spatial data and interaction data to a computer. Mapping unit 115 may also provide the spatial data to an event handler of a computer that processes actions as events of the preferred input device. Mapping unit 115 may also provide the interaction data to an event handler of the computer that processes keystrokes of the preferred input device.

Mapping unit 115 may segment a first object 170 (e.g., an object which could be somewhat shaped like a preferred input device) into a first section corresponding to a first functionality (e.g. button, key, touch, etc.) of the preferred input device and a second section corresponding to a second functionality of the preferred input device, set the interaction data to indicate the first functionality has been triggered when a position of a second object 170 (e.g., a finger, a stylus, etc.) overlaps the first section, and set the interaction data to indicate the second functionality has been triggered when the position overlaps the second section. Mapping unit 115 may also resize the first object 170 prior to the segmenting to match a size of the preferred input device, and move the position in proportion to an amount of the resizing. Mapping unit 115 may also set interaction data to indicate the first functionality has been activated when a position of a tracked event or action overlaps the first section, and set interaction data to indicate the second functionality has been activated when the position overlaps the second section.

Thus, for example, a mouse may be segmented into a first button and a second button, whereas a keyboard could be segmented into different keys. An object such as a flat surface of a table may then be mapped such that different points on the surface may correspond to the buttons or keys of the input device.

In some examples, the object mapping system 100 outputs the spatial data to an event handler of the computer that processes actions as events of the preferred input device. In some examples, the Object mapping system 100 outputs the interaction data to an event handler of a computer that processes keystrokes of the preferred input device.

Camera controller 145 may control a camera 160 to capture a plurality of images. Ranking unit 150 may rank the objects 170 according to the determined properties.

Tracking unit 155 may track the selected object 170 and a human being. In some examples, the tracking comprises using the camera 160 to capture an additional image, performing object recognition on the additional image to identify a first object 170 that corresponds to the selected object 170 and a second object 170 that corresponds to the human being. In some examples, the tracking of the selected object 170 tracks actions on the first object 170, and the spatial data is generated from the tracked action, event or movement.

In some examples, the tracking determines a distance of the tracked action, resizes the distance according to a size of the preferred input device, and the spatial data is generated from the resized distance. In some examples, the tracking of the selected object 170 includes extracting features of the second object, applying the features to a classifier trained to classify input features into one of a plurality of gestures to identify one of the gestures, calculating a spatial distance between the identified gesture, mapping a closest one of a plurality of segments of the first object to the identified gesture, and determining the interaction data from the mapping. In some examples, the tracking of the selected object 170 tracks movement of a finger, and the interaction data is generated from a position of the tracked action with respect to the first object.

Camera 160 may be an example of, or include aspects of, the corresponding elements described with reference to FIG. 2. User 165 may be an example of, or include aspects of, the corresponding elements described with reference to FIG. 2. Object 170 may be an example of, or include aspects of, the corresponding elements described with reference to FIGS. 2 and 9.

Figure 2:
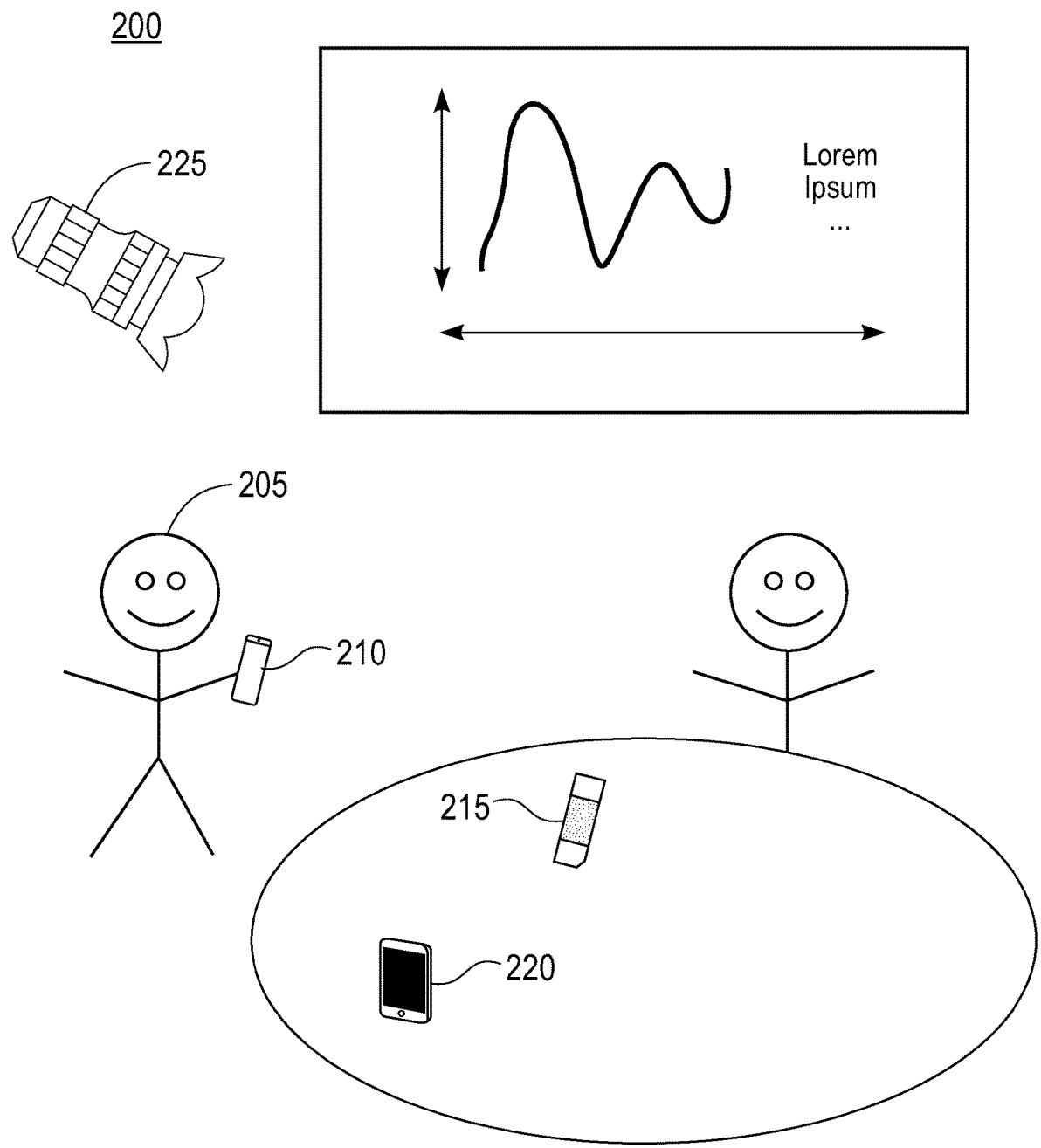
FIG. 2 shows an example of an application scenario for an object mapping system in accordance with aspects of the present disclosure.

FIG. 2 shows an example of an application scenario for an object mapping system 200 in accordance with aspects of the present disclosure. The example shown includes object mapping system 200, user 205, device 210, object 215, GUI 220, and camera 225.

The present example illustrates a collaborative session with multiple people discussing a presentation. User 205 has an interactive device 210, that is used to interact with a screen. In some examples, the interactive device 210 may be handled by people other than user 205, so that they may also interact with the presentation. For example, user 205 may hand over the interactive device 210 so different people can interact with the presentation.

However, the object mapping system 200 may also enable user 205 of the system to replicate the device 210, therefore the device 210 is now considered as the preferred input device. For example, the user 205 may replicate the device 210 by issuing a voice command The object mapping system 200 may then use camera 225 (e.g., one or more cameras or capture devices) to identify the interactive device 210, its functionalities and design affordances. The object mapping system 200 may also use the camera 225 to sense the environment, looking for objects 215 that could be used to replace the device functionalities of the interactive device 210.

Once the object mapping system 200 has identified objects 215, it may display (e.g., on the screen) how well each object 215 would perform considering the needed affordances to replicate the device 210. The object mapping system 200 may also rank detected objects 215 according to their affordance appropriateness. In some examples, the object mapping system 200 presents visual instructions about how to handle the object 215, to mimic the device 210. As an example, user 205 may select an object 215 such as a pen to interact with the presentation in place of the device 210. The object mapping system 200 may also enable other people to interact with the presentation using similar or unrelated objects 215.

Object mapping system 200 may be an example of, or include aspects of, the corresponding elements described with reference to FIG. 1. User 205 may be an example of, or include aspects of, the corresponding elements described with reference to FIG. 1.

Device 210 may be an example of, or include aspects of, the corresponding elements described with reference to FIG. 9. Object 215 may be an example of, or include aspects of, the corresponding elements described with reference to FIGS. 1 and 9.

GUI 220 may be an example of, or include aspects of, the corresponding elements described with reference to FIG. 1. Camera 225 may be an example of, or include aspects of, the corresponding elements described with reference to FIG. 1.

Figure 3:
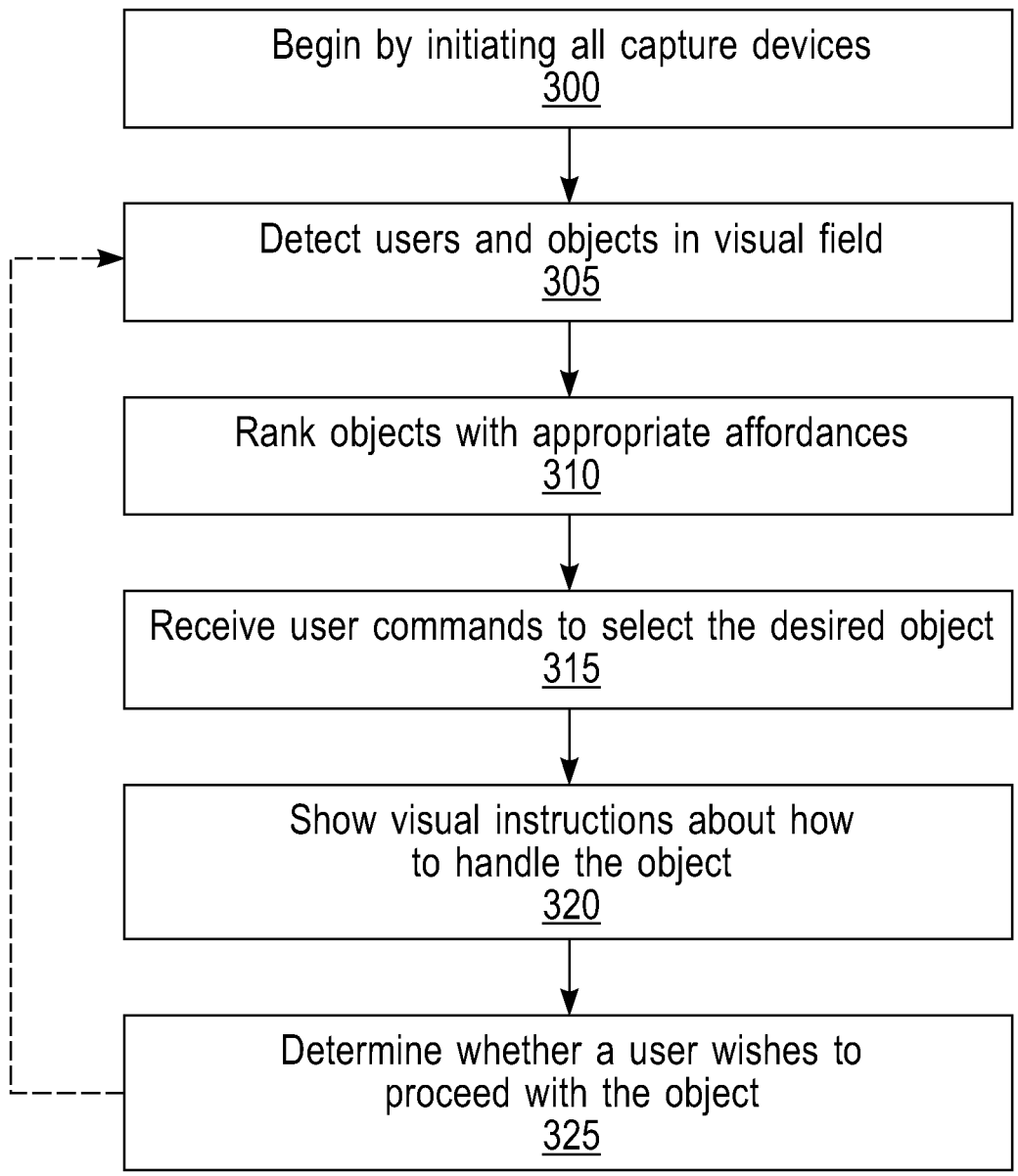
FIG. 3 shows an example of a setup process for an object mapping system in accordance with aspects of the present disclosure.

FIG. 3 shows an example of a setup process for an object mapping system in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At step 300, the object mapping system may begin by initiating all capture devices (e.g., one or more cameras). In some cases, the operations of this step may refer to, or be performed by, a camera controller as described with reference to FIG. 1.

At step 305, the object mapping system may detect users and objects in visual field. A visual field may refer to what the cameras or other capture device can perceive, and possibly smaller if a user limits the capture devices to a specific area. In some cases, the operations of this step may refer to, or be performed by, an object recognition unit as described with reference to FIG. 1.

At step 310, the object mapping system may rank objects with appropriate affordances. An object may be said to have appropriate affordances if it has properties that allow it to be used in a manner similar to the input device to be replicated. In some cases, the operations of this step may refer to, or be performed by, a ranking unit as described with reference to FIG. 1.

At step 315, the object mapping system may receive user commands to select the desired object (e.g., a system receives information identifying an object when a user selects one of the presented objects). In some cases, the operations of this step may refer to, or be performed by, a GUI as described with reference to FIGS. 1 and 2.

At step 320, the object mapping system may show visual instructions about how to handle the object. That is, the system segments the selected object into areas that correspond to areas of the preferred input device, and illustrates the actions that occur when these areas are selected (e.g., single clicked, doubled clicked, etc.). For example, the system might illustrate which part of the object outputs an imaginary laser so the user knows which side to aim at the screen to simulate a laser pointer. In some cases, the operations of this step may refer to, or be performed by, a GUI as described with reference to FIGS. 1 and 2.

At step 325, the object mapping system may determine whether a user wishes to proceed with the object. If so, the setup process is complete. If not, return to step 305. In some cases, the operations of this step may refer to, or be performed by, an object mapping system as described with reference to FIGS. 1 and 2.

Figure 4:
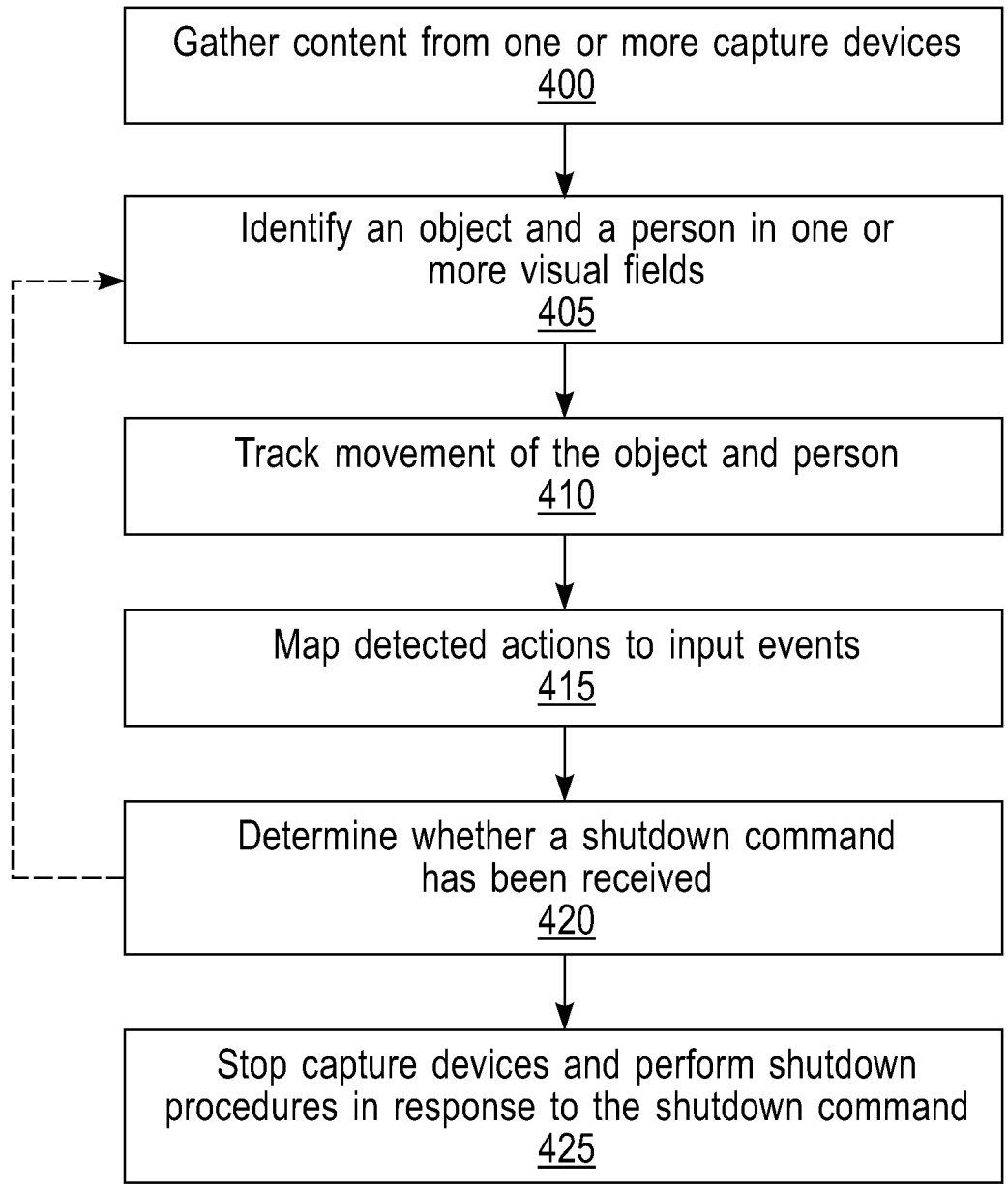
FIG. 4 shows an example of a runtime process for an object mapping system in accordance with aspects of the present disclosure.

FIG. 4 shows an example of a runtime process for an object mapping system in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At step 400, the object mapping system may gather content from one or more capture devices. The process may be initiated after the user selects an object (i.e., so the system can look for a such an object and treat it like a preferred input device). In some cases, the operations of this step may refer to, or be performed by, a camera as described with reference to FIGS. 1 and 2.

At step 405, the object mapping system may identify an object and a person in one or more visual fields (e.g., use the cameras to capture images). In some cases, the operations of this step may refer to, or be performed by, an object recognition unit as described with reference to FIG. 1.

At step 410, the object mapping system may track movement of the object (e.g. inclination, rotation) and actions of the person (e.g. gestures, head, touch, etc.). In one example, tracking of a person might include tracking a finger and its movement with respect to an object being used to represent a preferred input device. In some cases, the operations of this step may refer to, or be performed by, a tracking unit as described with reference to FIG. 1.

At step 415, the object mapping system may map detected actions to input events. In some cases, the operations of this step may refer to, or be performed by, a mapping unit as described with reference to FIG. 1.

At step 420, the object mapping system may determine whether a shutdown command has been received. If so, proceed to the next step. If not, return to step 405. In some cases, the operations of this step may refer to, or be performed by, an object mapping system as described with reference to FIGS. 1 and 2.

At step 425, the object mapping system may stop capture devices and perform shutdown procedures in response to the shutdown command. In some cases, the operations of this step may refer to, or be performed by, a camera controller as described with reference to FIG. 1.

Figure 5:
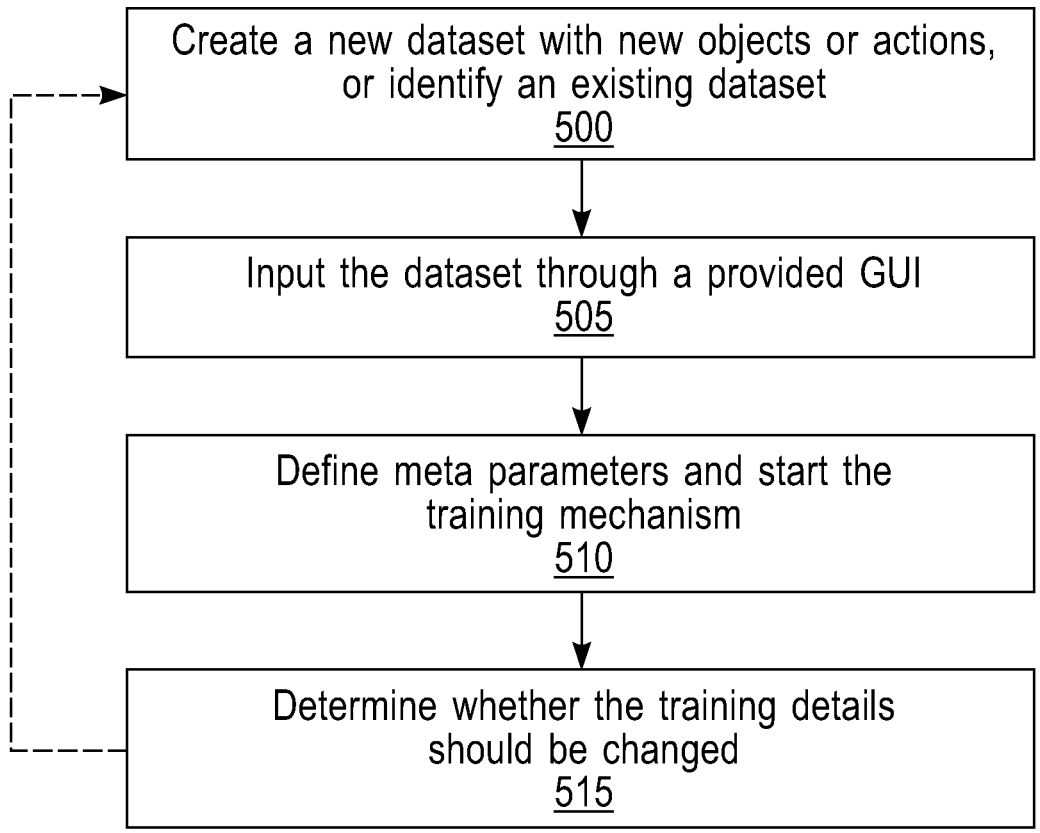
FIG. 5 shows an example of a learning process for an object mapping system in accordance with aspects of the present disclosure.

FIG. 5 shows an example of a learning process for an object mapping system in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 500, the object mapping system may create a new dataset with new objects or actions, or identify an existing dataset. For example, a user could direct the system to learn how to support a new type of input device or to modify an existing model of an input device to support additional actions (e.g., adding a triple click function). In some cases, the operations of this step may refer to, or be performed by, a learning unit as described with reference to FIG. 1.

At step 505, the object mapping system may input the dataset through a provided GUI. In some cases, the operations of this step may refer to, or be performed by, a GUI as described with reference to FIGS. 1 and 2.

At step 510, the object mapping system may define meta parameters and start the training mechanism. For example, meta parameters could be tuned to support new functionalities such as how many buttons an input device has, button sizes and locations, whether a wheel is present, whether single or double clicking is supported, or whether only a certain area of the room is to be used during the tracking, etc. In some cases, the operations of this step may refer to, or be performed by, a learning unit as described with reference to FIG. 1.

At step 515, the object mapping system may determine whether the training details should be changed. If not, the process is complete. If so, return to step 500. In some cases, the operations of this step may refer to, or be performed by, a learning unit as described with reference to FIG. 1.

Figure 6:
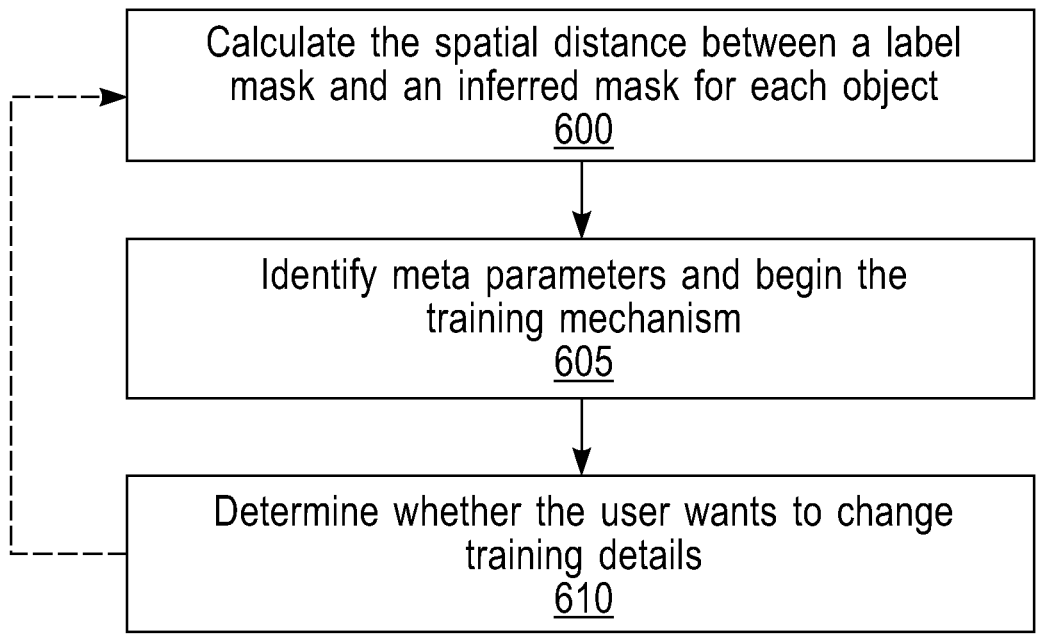
FIG. 6 shows an example of a classification process for an object mapping system in accordance with aspects of the present disclosure.

FIG. 6 shows an example of a classification process for an object mapping system in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 600, the object mapping system may calculate the spatial distance between a label mask and an inferred mask for each object. In some cases, the operations of this step may refer to, or be performed by, a learning unit as described with reference to FIG. 1.

At step 605, the object mapping system may identify meta parameters and begin the training mechanism. In some cases, the operations of this step may refer to, or be performed by, a learning unit as described with reference to FIG. 1.

At step 610, the object mapping system may determine whether the user wants to change training details. If so, return to step 600. If not, the process is complete. In some cases, the operations of this step may refer to, or be performed by, a learning unit as described with reference to FIG. 1.

Figure 7:
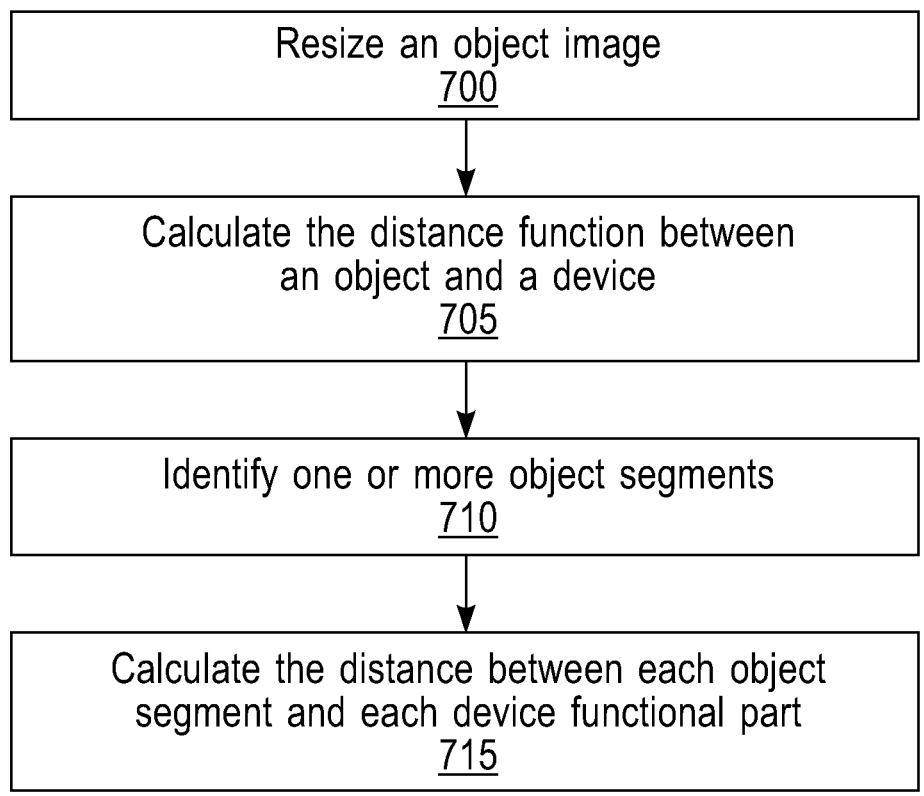
FIG. 7 shows an example of an object/device understanding process for an object mapping system in accordance with aspects of the present disclosure.

FIG. 7 shows an example of an object/device understanding process for an object mapping system in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 700, the object mapping system may resize an object image. In some cases, the tracked object (e.g., an eraser) could be smaller than the actual preferred input device, and thus without the resizing, the system might erroneously conclude that a 1st button was selected when in fact a 2nd button was intended. In some cases, the operations of this step may refer to, or be performed by, a mapping unit as described with reference to FIG. 1.

At step 705, the object mapping system may calculate the distance function between an object and a device. In some cases, the operations of this step may refer to, or be performed by, a mapping unit as described with reference to FIG. 1.

At step 710, the object mapping system may identify one or more object segments. In some cases, the operations of this step may refer to, or be performed by, a mapping unit as described with reference to FIG. 1.

At step 715, the object mapping system may calculate the distance between each object segment and each device functional part. For example, the system may calculate the distance between an edge of the tracked object and a point where the finger is. In some cases, an object may be resized in proportion to determine whether a section the user is touching on the object corresponds to a given functionality of the preferred input device (e.g. left-button of a mouse device). In some cases, the operations of this step may refer to, or be performed by, a mapping unit as described with reference to FIG. 1.

Figure 8:
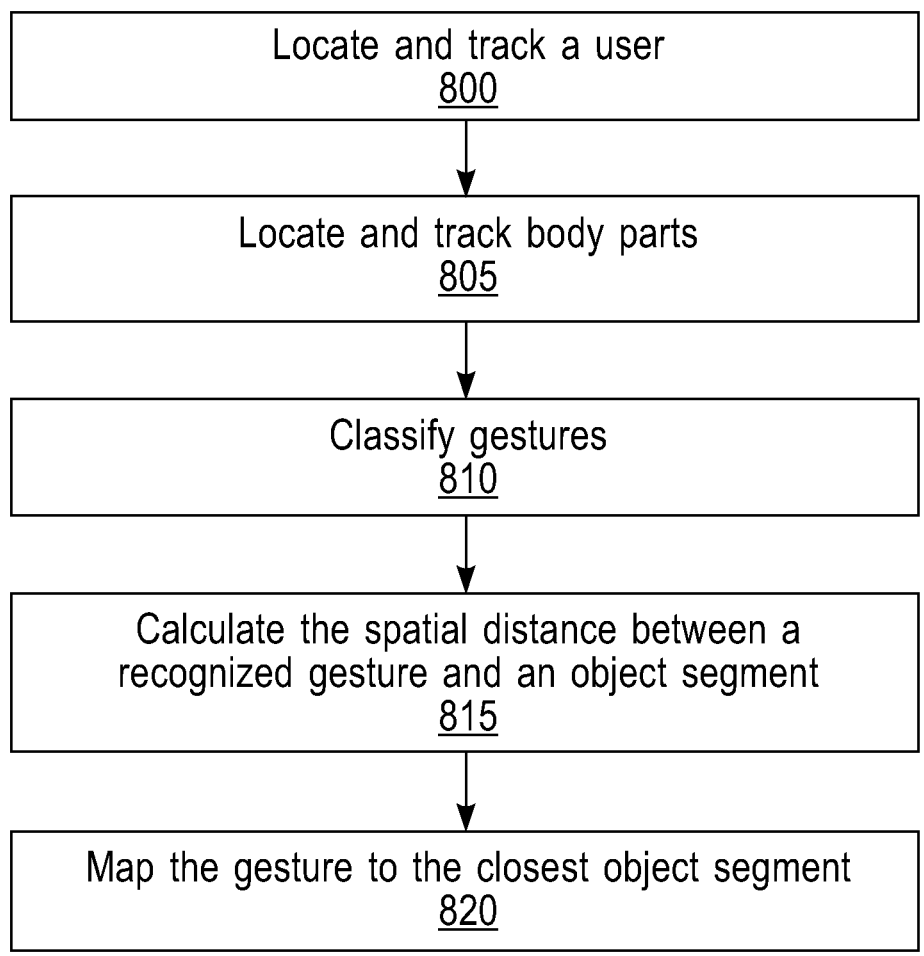
FIG. 8 shows an example of a body/object understanding process for an object mapping system in accordance with aspects of the present disclosure.

FIG. 8 shows an example of a body/object understanding process for an object mapping system in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 800, the object mapping system may locate and track a user. In some cases, the operations of this step may refer to, or be performed by, a tracking unit as described with reference to FIG. 1.

At step 805, the object mapping system may locate and track body parts (e.g., hands, arms, head, legs, fingers and feet). In some cases, the operations of this step may refer to, or be performed by, a tracking unit as described with reference to FIG. 1.

At step 810, the object mapping system may classify gestures. In some cases, the operations of this step may refer to, or be performed by, a tracking unit as described with reference to FIG. 1.

At step 815, the object mapping system may calculate the spatial distance between a recognized gesture and an object segment. In some cases, the operations of this step may refer to, or be performed by, a tracking unit as described with reference to FIG. 1.

At step 820, the object mapping system may map the gesture to the closest object segment. For example, the gestures could include the user single or double clicking their finger, moving a finger up and down to simulate movement of a mouse wheel, rotating a hand to simulate moving a laser pointer to a new location, etc. In some cases, the operations of this step may refer to, or be performed by, a mapping unit as described with reference to FIG. 1.

Figure 9:
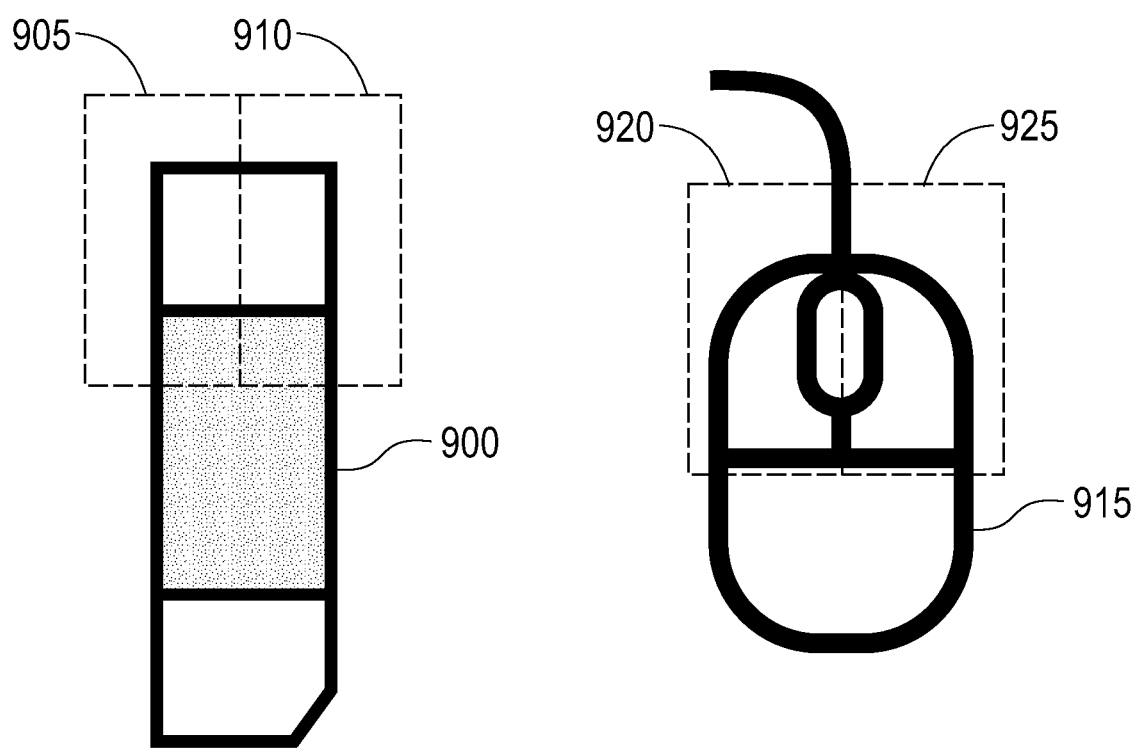
FIG. 9 shows an example of an object/device segmentation and mapping in accordance with aspects of the present disclosure.

FIG. 9 shows an example of an object 900/device 915 segmentation and mapping in accordance with aspects of the present disclosure. The example shown includes object 900 and device 915. Although the device 915 shown is a mouse device, any input device (e.g., a keyboard or a laser pointer) may be used.

The object 900 may be segmented into first region 905 and second region 910. The first region 905 may be defined based on a correspondence with the first button 920 (or other input component, such as a key). Thus, if a user contacts the first region 905 (e.g., with a recognized motion), the object mapping system may issue a command corresponding to the first button 920. The second region 910 may be defined based on a correspondence with the second button 925. Thus, if a user contacts the second region 910, the object mapping system may issue a command corresponding to the second button 925.

The object 900 may be mapped to the device 915. The first region 905 may be mapped to the first button 920. The second region 910 may be mapped to the second button 925. Object 900 may be an example of, or include aspects of, the corresponding elements described with reference to FIGS. 1 and 2. Object 900 may include first region 905 and second region 910. Device 915 may be an example of, or include aspects of, the corresponding elements described with reference to FIG. 2.

Device 915 may include first button 920 and second button 925. The first button 920 may be an example of a first functionality, and the second button 925 may be an example of a second functionality. Other examples include keys (i.e., of a keyboard), or click wheels, or any other component of an input device that may be used to create input events.

Figure 10:
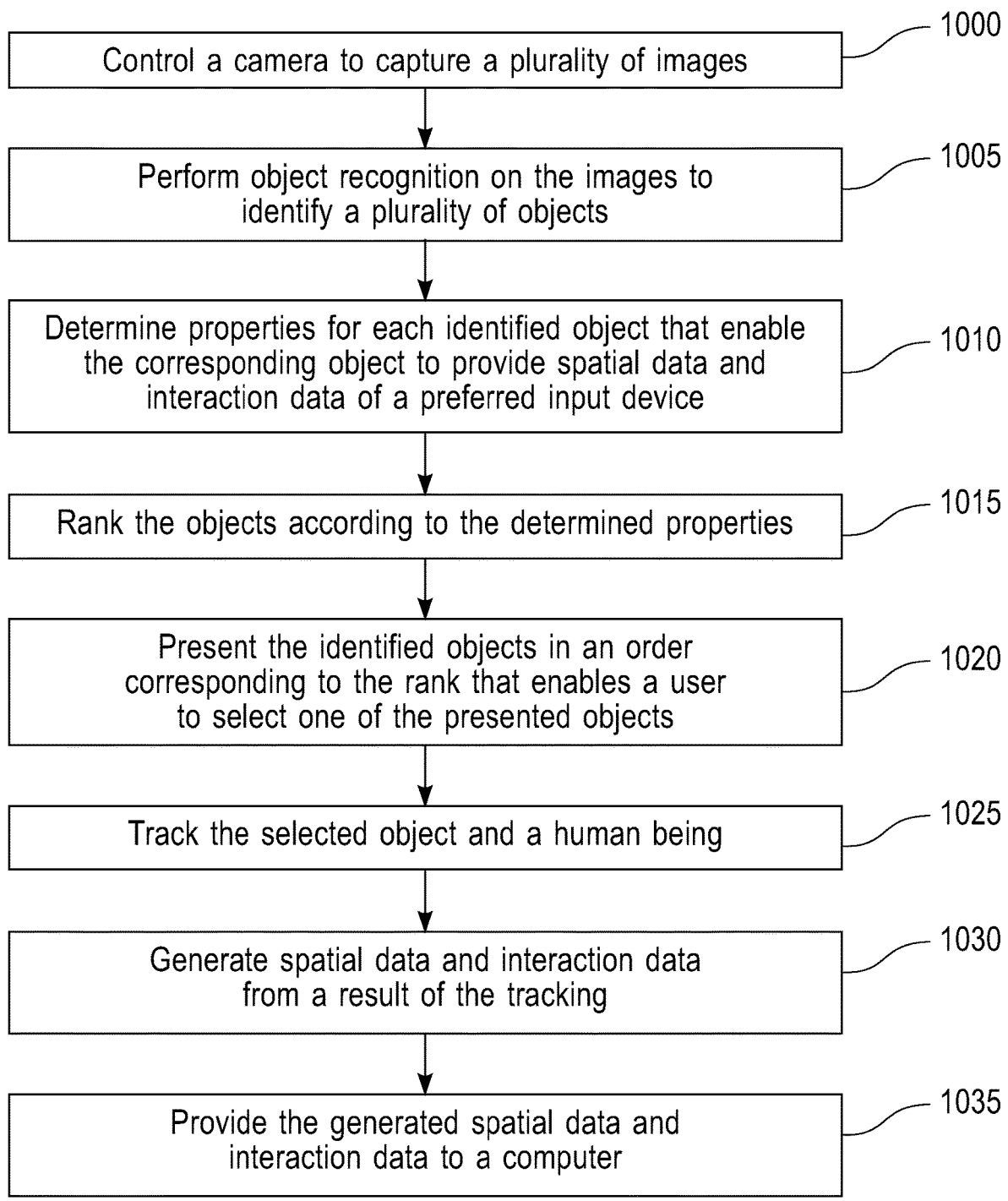
FIG. 10 shows an example of an object mapping process in accordance with aspects of the present disclosure.

FIG. 10 shows an example of an object mapping process in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 1000, the object mapping system may control a camera to capture a plurality of images. In some cases, the operations of this step may refer to, or be performed by, a camera controller as described with reference to FIG. 1.

At step 1005, the object mapping system may perform object recognition on the images to identify a plurality of objects. In some cases, the operations of this step may refer to, or be performed by, an object recognition unit as described with reference to FIG. 1.

At step 1010, the object mapping system may determine properties for each identified object that enable the corresponding object to provide spatial data and interaction data of the preferred input device. In some cases, the operations of this step may refer to, or be performed by, an object recognition unit as described with reference to FIG. 1.

At step 1015, the object mapping system may rank the objects according to the determined properties. In some cases, the operations of this step may refer to, or be performed by, a ranking unit as described with reference to FIG. 1.

At step 1020, the object mapping system may present the identified objects in an order corresponding to the rank that enables a user to select one of the presented objects. In some cases, the operations of this step may refer to, or be performed by, a GUI as described with reference to FIGS. 1 and 2.

At step 1025, the object mapping system may track the selected object and a human being. In some cases, the operations of this step may refer to, or be performed by, a tracking unit as described with reference to FIG. 1.

At step 1030, the object mapping system may generate spatial data and interaction data from a result of the tracking. In some cases, the operations of this step may refer to, or be performed by, a mapping unit as described with reference to FIG. 1.

At step 1035, the object mapping system may provide the generated spatial data and interaction data to a computer. In some cases, the operations of this step may refer to, or be performed by, a mapping unit as described with reference to FIG. 1.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A method for object mapping, comprising:
controlling a camera to capture a plurality of images;
performing object recognition on the images to identify a plurality of real objects;
determining affordance properties for each identified real object that enable the corresponding real object to provide spatial data and interaction data as a preferred input device;
ranking the real objects according to an order representing suitability for use as the preferred input device based on the determined affordance properties;
presenting the identified real objects in the order corresponding to the ranking to enable a user to select one of the presented real objects for use as the preferred input device;
tracking the selected real object and a human being;
generating spatial data and interaction data from a result of the tracking; and
providing the generated spatial data and interaction data to a computer.

2. The method of claim 1, wherein:
the tracking comprises using the camera to capture an additional image, performing object recognition on the additional image to identify a first object that corresponds to the selected real object and a second object that corresponds to the human being.

3. The method of claim 2, wherein:
the tracking of the selected real object tracks an action of the first object, and the spatial data is generated from the tracked action.

4. The method of claim 3, wherein:
the providing outputs the spatial data to an event handler of the computer that processes events of the preferred input device.

5. The method of claim 3, wherein:
the tracking determines a distance of the tracked action, resizes the distance according to a size of the preferred input device, and the spatial data is generated from the resized distance.

6. The method of claim 3, further comprising:
providing the spatial data to an event handler of a computer that processes events of the preferred input device.

7. The method of claim 3, wherein:
the preferred input device is a presentation pointer with a laser, the tracked action of the selected real object indicates an orientation of the laser, and the spatial data is generated from the orientation.

8. The method of claim 7, further comprising:
providing the interaction data to an event handler of the computer that processes keystrokes of the preferred input device.

9. The method of claim 7, wherein:
the tracking of the selected real object includes extracting features of the second object, applying the features to a classifier trained to classify input features into one of a plurality of gestures to identify one of the gestures, calculating a spatial distance between the identified gesture, mapping a closest one of a plurality of segments of the first object to the identified gesture, and determining the interaction data from the mapping.

10. The method of claim 2, wherein:
the tracking of the selected real object tracks an action of a finger, and the interaction data is generated from a position of the tracked action with respect to the first object.

11. The method of claim 10, wherein:
the providing outputs the interaction data to an event handler of the computer that processes keystrokes of the preferred input device.

12. The method of claim 2, further comprising:
segmenting the first object into a first section corresponding to a first functionality of the preferred input device and a second section corresponding to a second functionality of the preferred input device; and
setting the interaction data to indicate the first functionality has been activated when a position of a tracked event overlaps the first section, and setting the interaction data to indicate the second functionality has been activated when the position overlaps the second section.

13. The method of claim 12, further comprising:
resizing the first object prior to the segmenting to match a size of the preferred input device and moving the position in proportion to an amount of the resizing.

14. The method of claim 1, wherein:
the object recognition is based on a model of the preferred input device, wherein the model is based on meta parameters, and the graphical user interface (GUI) enables a user to change the meta parameters.

15. The method of claim 2, wherein:
the object recognition based on the additional image only considers objects within a certain field of view and the GUI enables a user to change a boundary of the field of view.

16. The method of claim 1, wherein:
the preferred input device is a mouse device.

17. A system for object mapping, comprising: a display device; a camera; a processor; and a memory storing instructions and in electronic communication with the processor, the processor being configured to execute the instructions to:

control a camera to capture a plurality of images;
perform object recognition on the images to identify a plurality of real objects;
determine affordance properties for each identified real object that enable the corresponding real object to provide spatial data and interaction data of the preferred input device;
rank the real objects according to an order representing suitability for use as the preferred input device based on the determined properties;
present the identified real objects in the order corresponding to the ranking to enable a user to select one of the presented real objects for use as the preferred input device;
track the selected real object and a human being;
generate spatial data and interaction data from a result of the tracking; and
provide the generated spatial data and interaction data to a computer.

18. The system of claim 17, wherein:
the tracking comprises using the camera to capture an additional image, performing object recognition on the additional image to identify a first object that corresponds to the selected real object and a second object that corresponds to the human being.

19. A non-transitory computer readable medium storing code for object mapping, the code comprising instructions executable by a processor to:
control a camera to capture a plurality of images;
perform object recognition on the images to identify a plurality of real objects;
determine affordance properties for each identified real object that enable the corresponding real object to provide spatial data and interaction data of a preferred input device;
rank the real objects according to an order representing suitability for use as the preferred input device based on the determined properties;
present the identified real objects in the order corresponding to the ranking to enable a user to select one of the presented real objects for use as the preferred input device;
track the selected real object and a human being;
generate spatial data and interaction data from a result of the tracking; and
provide the generated spatial data and interaction data to a computer.

20. The non-transitory computer-readable medium of claim 19, wherein:
the tracking comprises using the camera to capture an additional image, performing object recognition on the additional image to identify a first object that corresponds to the selected object and a second object that corresponds to the human being.

* * * * *